June 26, 1928.  
C. P. EISENHAUER  
1,674,718  
VALVE FOR PUMPS  
Filed March 7, 1927

INVENTOR.  
Charles P. Eisenhauer,  
BY Toulmin & Toulmin  
ATTORNEYS.

Patented June 26, 1928

1,674,718

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

VALVE FOR PUMPS.

Application filed March 7, 1927. Serial No. 173,374.

My invention relates to pumps and in particular to valves for pumps.

It is the object of my invention to provide a valve in a pump which will absorb the shock of delivery of the fluid particularly when the direction of the piston is reversed and the compression of the liquid impedes the movement of the piston.

In high speed pumps, this is especially advantageous in that the hammering and jarring, which is not only audible and disagreeable but injurious to the mechanism, can be thus eliminated.

It is a further object to provide a non-corrosive, self-contained valve mechanism which is absolutely noiseless, and which permits of a large area for the quick exit of fluid especially necessary in connection with high speed pumps.

It is a further object to provide a cushioning spring valve mechanism.

It is a further object to provide a constant motor load thereby eliminating the fluctuation in current consumption that occurs in pumps where a heavy impact in the pump operation must be made.

Referring to the drawings.

Figures 1, 2:
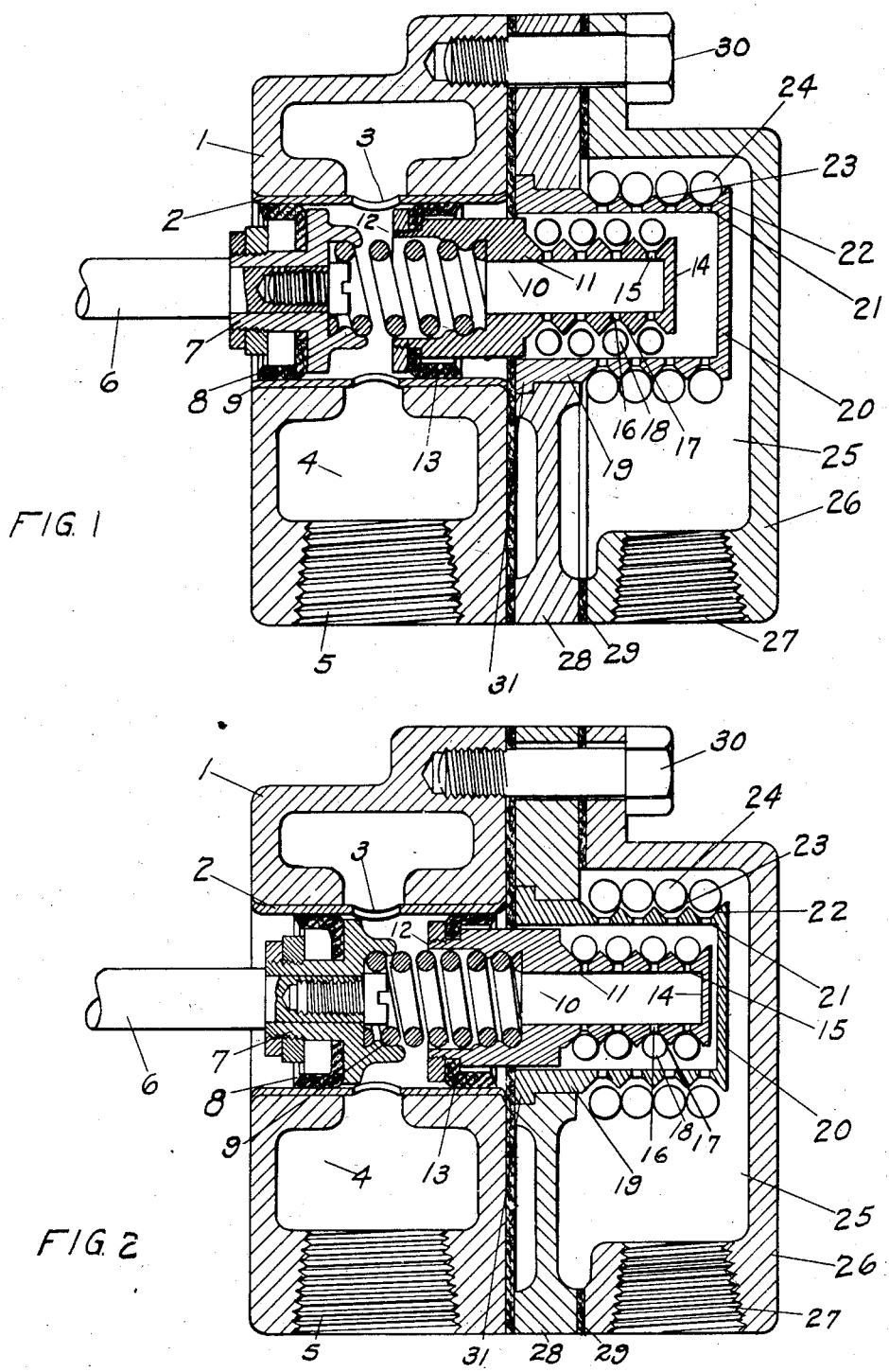
Figure 1 is a section through the valve mechanism showing the parts when the liquid is being drawn from the suction chamber into the piston chamber.
Figure 2 is a similar view showing a discharge of the liquid from the piston chamber into the discharge chamber.

Referring to the drawings in detail, 1 is a cylinder and intake port housing containing a cylinder liner 2, which is provided with inlet ports 3 from the inlet chamber 4 in the housing 1, which inlet chamber is fed through an opening 5 with liquid from any desired source.

6 designates a piston rod on which is mounted a piston 7 having a washer 8. This piston supports on its end opposite to that from which projects the piston rod a relatively heavy shock absorbing helical spring 9 adapted to normally have spaces between the coils for the entrance of the incoming liquid into the center of the spring into the chamber 10 within the cylinder 11. This cylinder 11 is formed with a skirt 12, the interior of which is connected to the spring 9. The exterior of the skirt is provided with a washer 13 so that in effect the cylinder 11 and skirt 12 becomes a supplementary piston yieldingly connected by the spring 9 to the piston 7. The end of the sleeve 11 is closed as at 14. The sleeve itself is provided with a plurality of radial apertures 15 arranged at intervals in a series of openings on all sides of the sleeve. The exit ends of these openings will be found as at 16 in the bottoms of grooves formed by tapering projecting shoulders 17 on the exterior of the sleeve, such tapered surfaces of such shoulders constituting valve seats for rubber rings 18 which are preferably circular in section.

The sleeve 11 and the supplementary piston or skirt 12 are adapted to move within a larger cylinder 19 spaced therefrom on the exterior thereof and also having a closed end 20. This cylinder is provided with a similar series of radial apertures, such as the apertures 21, the outer ends of which open into the depressed space between the tapered shoulders 22 formed by ridges 23 having such tapered shoulders.

Between these shoulders are mounted the elastic valve rings 24 adapted to seal the openings normally. The last mentioned cylinder 19 is located within an exit chamber 25 formed in the casing 26 which is connected to an exit passageway 27. The cylinder is supported in a ring 28 between the exit chamber 26 and the inlet casing 1. Suitable washers 29 seal the parts together, while bolts, such as 30, hold the parts in fixed engagement with one another. The cylinder 19 is provided with an annular shoulder 31 which is engaged between the ring 28 and the casing 1 on the one hand while the ring 28 is engaged between the casing 26 and the casing 1.

Method of operation.

The fluid is drawn in through the port 3 from the chamber 4 into the cylinder lining 2 by movement of the piston to the right hand so that the fluid may enter through the coils of the spring 9 to the interior 10 of the hollow portion of the piston designated 11. When the piston returns to the left hand the shock of the return is absorbed by the yielding nature of the connection between the relatively movable piston and the piston which is stationarily mounted on the piston rod 6.

The inertia of the fluid within the hollow piston 11, the compression of it by the relatively fast movement of the piston 11 to the left hand and the vacuum condition within the cylinder head 19 all serve to cause a lifting of the valve rings 18 and a discharge of the liquid in the piston through the port 16 into the piston head 19. Upon the return again to the right hand, the rings 18 are seated upon the ports 16 and the fluid in the cylinder head 19 is put under compression and ejected through the ports 21 as the pressure in the cylinder lifts the rings 19 discharging the fluid into the chamber 25 formed by the casing 26. The shock of such compression will be absorbed by the spring 9 as its coils will be compressed, so that the ejection stroke will have eliminated therefrom the pounding and hammering and the effect of the compression from the machinery and piping, which is particularly objectionable in domestic installations.

It will be understood that I desire to comprehend within my invention such modifications as may be necessary to adapt it to varying conditions and uses.

Having thus fully described my invention, what I claim is new and desire to secure by Letters Patent, is:—

1. In combination a cylinder, a piston having a hollow piston head resiliently mounted thereon provided with a plurality of apertures, resilient sealing means mounted on said piston adapted to seal said apertures, said cylinder having a plurality of exit openings, a plurality of exteriorly disposed resilient sealing members and a discharge casing mounted over and spaced from said cylinder end, and means for cushioning the effect of compression by the piston on the contents of the cylinder.

2. In combination a cylinder having an inlet port, a piston connected to a piston rod, one portion of which is stationarily mounted thereon and the other portion of which is spaced from the first portion and yieldingly mounted on the piston rod, said second portion being hollow with a plurality of exit openings, yielding means mounted on the exterior of said hollow portion of the piston for closing said openings and a cylinder head having a plurality of exit openings and yielding means for closing said openings whereby the fluid enters the cylinder between said piston portions, passes through the yielding means in- to the interior of the piston making its exit through the openings therein and thence through the openings in the cylinder head.

3. In combination a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom.

4. In combination, a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom, said valve means consisting of a resilient sealing ring mounted on the exterior of said moving cylinder adapted to seal a plurality of apertures in the wall of said cylinder.

5. In combination, a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom, said valve means consisting of a resilient sealing ring mounted on the exterior of said moving cylinder adapted to seal a plurality of apertures to the wall of said cylinder, and a stationary cylinder adapted to receive telescopically the moving cylinder and having a plurality of radial apertures and a sealing ring adapted to seal such apertures to control the exit of fluid therethrough.

6. In combination in a pump of a pump cylinder having an inlet port, a piston, a piston rod, a moving cylinder connected to said piston adapted to permit the entering liquid in the cylinder to enter therein, said moving cylinder having a plurality of radial ports and a resilient sealing ring mounted on the exterior of the cylinder for sealing said ports, whereby as the liquid is compressed within said moving cylinder as it moves with the piston the liquid will make its exit by lifting said resilient sealing ring, and a second stationary cylinder within which the moving cylinder is adapted to telescope, said second stationary cylinder having a plurality of radially-disposed ports, and a resilient sealing ring adapted to close said ports on the exterior thereof, said moving cylinder and said second stationary cylinder each having a groove adjacent said ports serving as a valve seat for each of the resilient sealing rings, and a resilient connection between said piston and said moving cylinder so arranged as to permit the entrance of fluid into the moving cylinder and to absorb the shock of compression by the moving cylinder of the liquid in the second stationary cylinder.

7. In combination, a cylinder having an inlet port, a piston, a piston rod, a hollow cylinder adapted to reciprocate with the piston within the stationary cylinder first mentioned, and yielding means connecting said piston and cylinder, whereby the shock of the compression by the moving cylinder will be absorbed by the yielding connection between said piston and moving cylinder.

In testimony whereof, I affix my signature.

CHARLES F. EISENHAUER.